INVENTOR.
LOUIS HENRY
BY
Brumbaugh, Free, Graves & Donohue
his ATTORNEYS

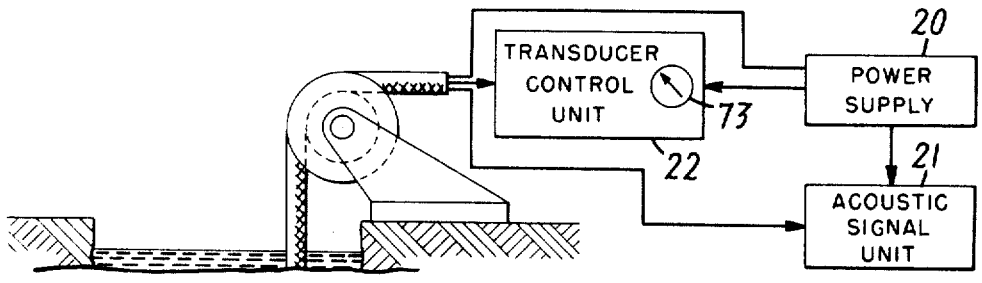
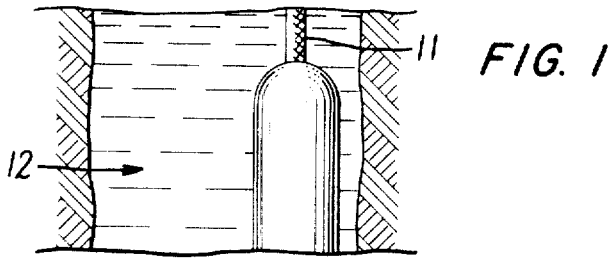
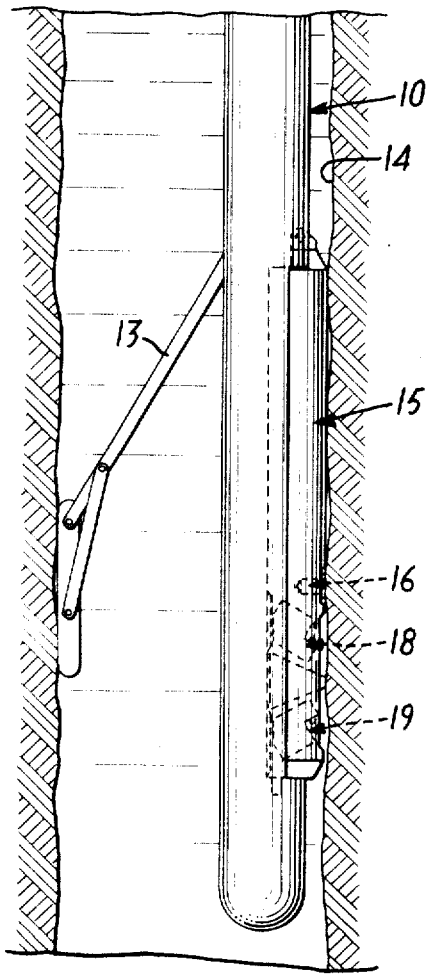
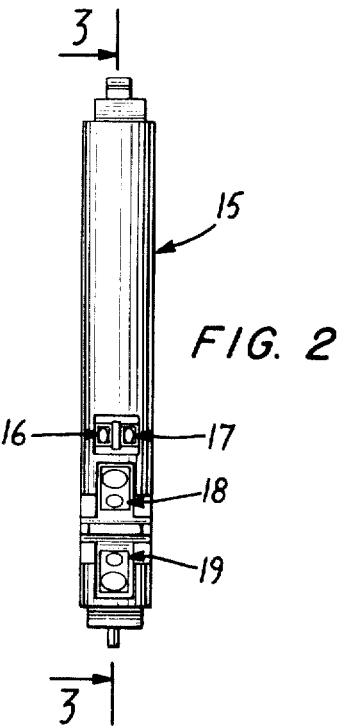
FIG. 1
FIG. 2
INVENTOR.
LOUIS HENRY
BY
his ATTORNEYS

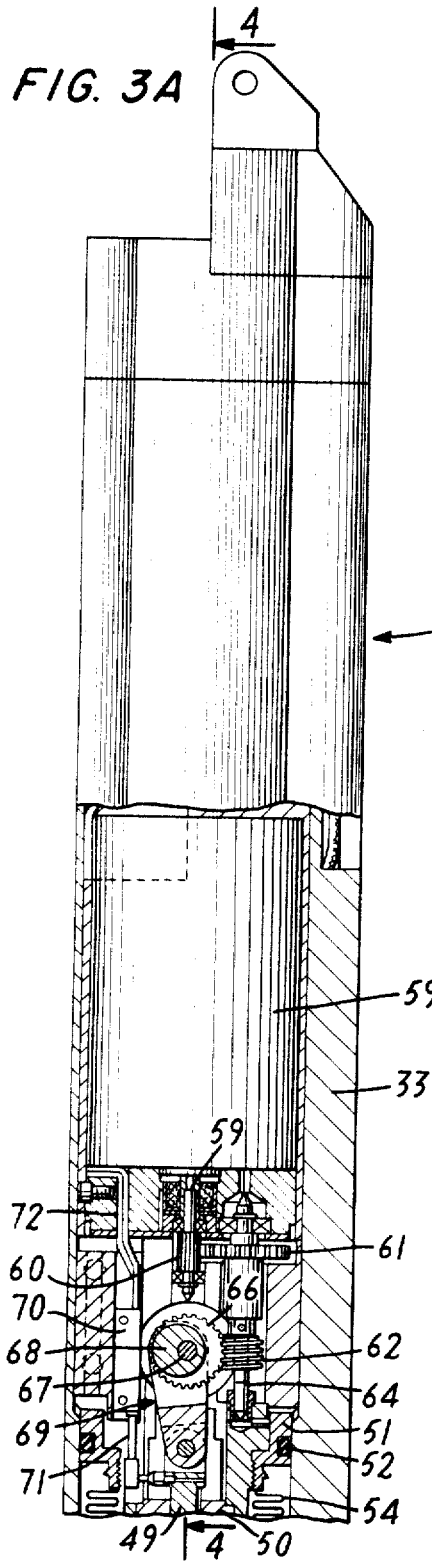
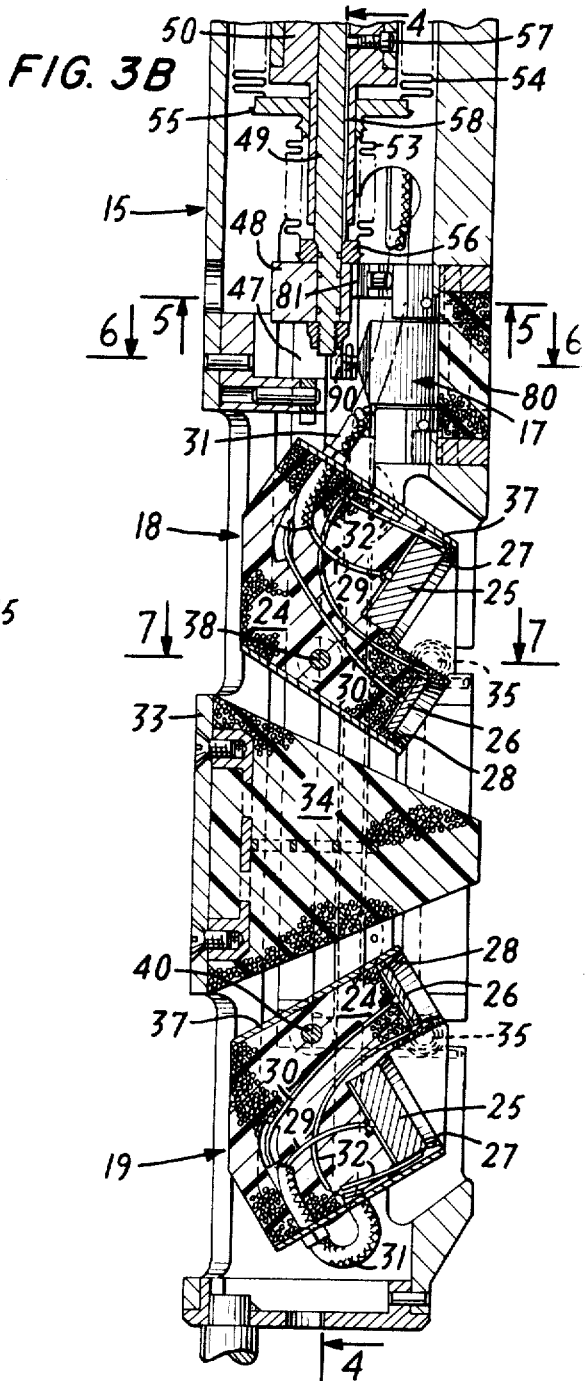
FIG. 3A
FIG. 3B
INVENTOR.
LOUIS HENRY
BY
Brumbaugh, Free, Graves & Donohue
his ATTORNEYS Feb. 11, 1969     L. HENRY     3,426,865
BOREHOLE SURVEYING APPARATUS WITH COMPLEMENTARY
ROTATION OF PAIRED TRANSDUCERS
Filed July 22, 1966     Sheet 3 of 4

INVENTOR.
LOUIS HENRY
BY Brumbaugh, Free, Graves & Donohue
his ATTORNEYS

United States Patent Office 3,426,865
Patented Feb. 11, 1969

3,426,865
BOREHOLE SURVEYING APPARATUS WITH COMPLEMENTARY ROTATION OF PAIRED TRANSDUCERS
Louis Henry, Chevilly-Larue, Val-de-Marne, France, assignor to Societe de Prospection Electrique Schlumberger, S.A., Paris, France, a corporation of France
Filed July 22, 1966, Ser. No. 567,117
U.S. Cl. 181—.5                7 Claims
Int. Cl. G10k 11/00; G01v 1/40, 1/00

ABSTRACT OF THE DISCLOSURE

In the particular embodiment of the invention described herein, a well logging instrument includes two pairs of angularly movable transducer assemblies directed at symmetric angles toward the wall of the well. One pair is positioned for angular motion in a vertical plane and the other is positioned for angular motion in a horizontal plane, each assembly including two transducers. A control mechanism actuated by signals from the surface of the earth controls the angular positions of the assemblies.

---

This invention relates to apparatus for investigating the nature of formations through which a well bore passes and more particularly to a new and improved form of apparatus wherein the angular orientation of directional transducer devices with respect to the wall of the bore may be controlled.

In my prior United States application Ser. No. 442,041 filed Mar. 23, 1965 for "Methods and Apparaus for Examining Formations Adjacent the Walls of Boreholes," there is described an arrangement for determining the existence of fractures in formations by detection of acoustic wave transmission characteristics. In that application it is pointed out that the fractures may be detected by transmitting acoustic compression waves and acoustic shear waves through the formation material and detecting the differences between characteristics of the signals after they have passed through the formation material. The detected signal characteristics, however, depend upon the manner of passage through the material and this, in turn, depends upon the angles of incidence and of emergence of the acoustic waves with respect to the formation material. Ordinarily, directional acoustic transducers are mounted in fixed orientation in a wall-engaging portion of an instrument adapted to be passed through a well bore. Consequently, it is not possible to determine the optimum angle of incidence and emergence of acoustic waves which will provide the most accurate determinations.

Accordingly, it is an object of the present invention to provide a new and improved transducer arrangement for well bore apparatus adapted to be adjusted to different orientations.

Another object of the invention is to provide a new and improved acoustic logging apparatus having acoustic transducers of adjustable orientation.

These and other objects of the invention are attained by providing in a well logging instrument a pivotally mounted directional transducer arrangement and a driving device for scanning the transducer arrangement through an arc of selected angular magnitude. Preferably an indicator is provided to transmit indications of the angular position of the transducer arrangement and in a particular embodiment a pair of directional transducers is mounted for simultaneous complementary angular motion in a common plane perpendicular to the wall of the well bore. In addition, a second pair of directional transducers is mounted for complementary pivotal motion in a common plane at an angle to the plane of the other pair of transducers.

Further objects and advantages of the invention will be apparent from a reading of the following description in conjunction with the accompanying drawings in which:

FIG. 1 is a vertical sectional view partly broken away, illustrating in side elevation a representative well logging tool arranged in a well bore and having adjustable transducers according to the invention;

FIG. 2 is a fragmentary front view of the tool shown in FIG. 1, illustrating the tool portion containing the adjustable transducers;

Figures 4A, 4B:
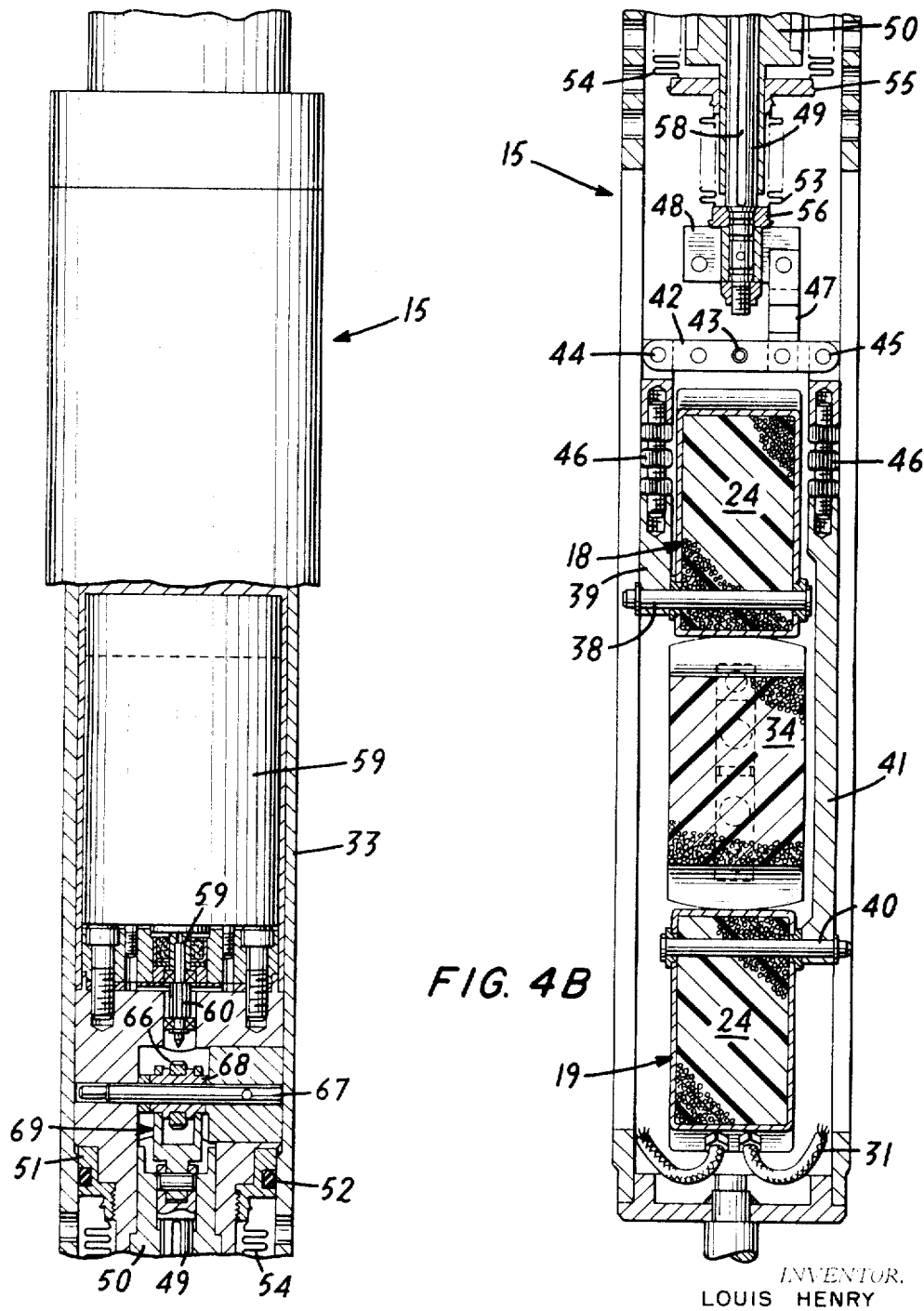
Figure 5:
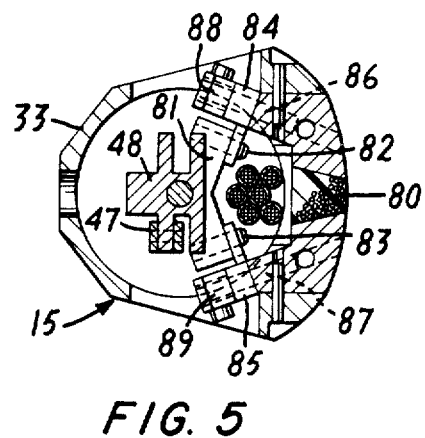
Figure 6:
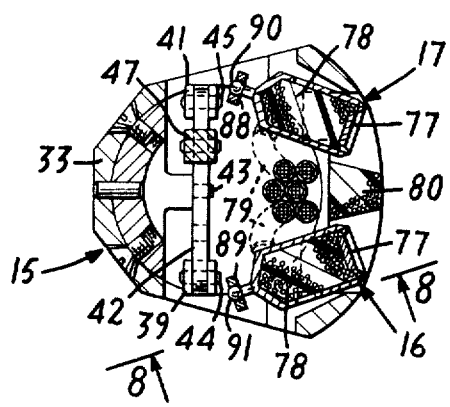
Figure 8:
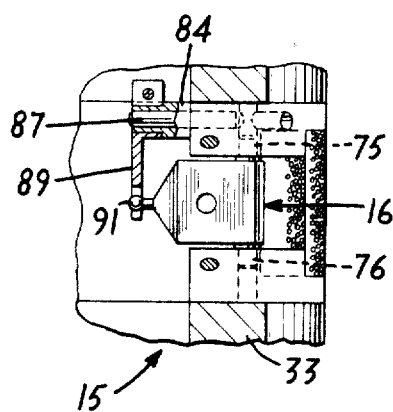
Figure 7:
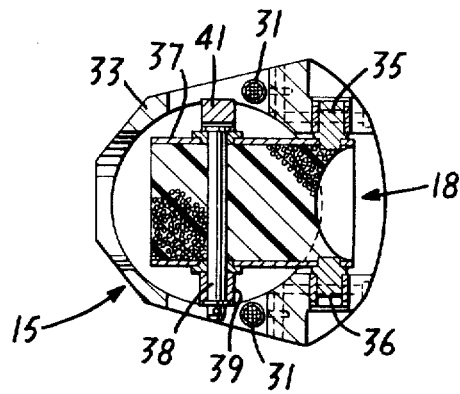

FIGS. 3A and 3B comprise an enlarged sectional view taken along the line 3—3 of FIG. 2 and looking in the direction of the arrows;

FIGS. 4A and 4B comprise an enlarged longitudinal sectional view of the adjustable transducer portion, taken along the line 4—4 of FIGS. 3A and 3B;

FIGS. 5, 6 and 7 are cross-sectional views, taken along the lines 5—5, 6—6 and 7—7, respectively, of FIGS. 3B and looking in the direction of the arrows; and FIG. 8 is a fragementary sectional view of the adjustable transducer portion, taken along the line 8—8 of FIG. 6 and looking in the direction of the arrows.

In the representative embodiment of the invention shown by way of example in FIG. 1, a well logging instrument 10 suspended by a multiconductor cable 11 in a well bore 12 is urged laterally by a spring-biased arm 13, so that one side of the instrument engages the wall 14 of the well bore affixed to the instrument 10, so as to engage the wall 14 against which the instrument is urged, is an acoustic transducer portion 15 containing, as best seen in FIGS. 2 and 3B, two pairs of angularly movable acoustic transducer assemblies designated 16 and 17, and 18 and 19, respectively. In addition, the apparatus includes a power supply 20, an acoustic signal unit 21 and a transducer control unit 22 disposed at the surface of the earth and electrically connected to the downhole instrument 10 by conductors in the cable 11. As described in greater detail hereinafter, the acoustic signal unit energizes acoustic signal generators in the assemblies 16 and 18, and responds to acoustic signal detectors in the assemblies 17 and 19 and the transducer control unit 22 controls the angular orientations of the assemblies 16, 17, 18 and 19.

As best seen in FIG. 3B, the transducer assemblies 18 and 19 each comprises a block 24 of an epoxy resin material filled with lead shot about 1/16" in diameter, so as to constitute an acoustic wave absorber, the resin material being, for example, the material sold under the trade name "Araldite." Two electroacoustical transducers 25 and 26 comprising discs of piezo-electric material are mounted in corresponding openings 27 and 28 at one end of the block so as to provide a directional path for acoustic waves traveling toward or away from the discs. Each disc is connected through a corresponding conductor 29, 30 in a cable 31 to the acoustic signal unit 21, a ground wire 32 also being connected to each disc. Affixed to the housing 33 of the unit 15 between the assemblies 18 and 19 is a pyramidal block 34 of the same acoustic wave-absorbing material, of which the blocks 24 are made, so as to prevent any direct transmission of acoustic waves from one assembly to the other.

Each of the assemblies 18 and 19 is supported for angular motion in a plane perpendicular to the axis of the housing 33 of the portion 15 by pivot pins 35 and 36 extending outwardly from each side of the casing 37 in which the acoustic block 34 is contained as best seen in the cross-sectional view of FIG. 7. Furthermore, as shown in FIG. 4B, the transducer assembly 18 has a transverse pin 38 extending outwardly from one side, to which the lower end of a vertical bar 39 is pivotally connected. Similarly, the assembly 19 has a transverse pin 40 extending outwardly from the opposite side and the lower end of another vertical bar 41 is pivotally connected to that pin. A lever 42 supported at its center from the housing 33 by a pivot pin 43 is rotatably received in corresponding wrist pins 44 and 45 at the upper ends of the bars 39 and 41, respectively. Consequently, angular motion of the lever 42 about its central support pin 43 moves the bars 39 and 41 in opposite directions, causing the transducer assemblies 18 and 19 to move about their support pins 35 in complementary angular motions. To permit adjustment of the relative angular positions of the assemblies 13 and 19, each of the bars 39 and 41 includes an adjusting screw and lock nut assembly 46.

In order to drive the transducers 18 and 19 to any desired complementary angular orientations within a selected range of angles, the lever 42 is pivotally connected through a link 47 to a cross bar 48 mounted at the lower end of a push rod 49. The push rod 49 is slidably supported for vertical motion in the housing 33 by a mount 50, which is threaded at its upper end to a ring 51 which, in turn, is connected to the housing 33 and has a fluid tight seal therewith formed by an O-ring 52 as shown at the bottom of FIG. 3A. To prevent any well bore fluid from entering the portion of the instrument above the ring 51, the mount 50 and the push rod 49 are surrounded by two flexible metal bellows 53 and 54 which are joined to an intermediate sleeve 55 slidable on the mount 50, and to a collar 56 attached to the push rod 49 above the crossbar 48. In use, the space within the bellows and above the ring 51, is filled with oil or other liquid to permit equalization of the pressures on opposite sides of the bellows.

In order to drive the push rod 49 which is prevented from rotation in the mount 50 by a key 57 engaging a groove 58, a sealed electric motor 59 has its drive shaft 60 connected through a pinion 61 and a gear 62 to a worm 63, the gear 62 and worm 63 being mounted on a shaft 64 supported in the housing 33 parallel to and laterally displaced from the shaft 60. In addition, a worm wheel 66 mounted for rotation on a transverse shaft 67 has eccentric cylindrical crank portions 68 on each side and these receive the ends of a yoke 69 which is pivoted to the upper end of the push rod 49. Accordingly, operation of the motor to rotate the worm 65 will cause the yoke 69 to drive the push rod first in one direction and then in the opposite direction, effecting complementary angular motion of the transducer assemblies 18 and 19 back and forth through angles of corresponding angular magnitude.

The motor 59 is controlled from the transducer control unit 22 at the surface of the earth by appropriate conductors in the cable 11 and in order to indicate the angular orientation of the transducers at any instant, a linear potentiometer 70 is mounted on the housing 33. The movable arm 71 of this potentiometer is connected to the upper end of the push rod 49, so as to be movable with it and to conductors 72 provide an electrical indication of the position of the push rod. At the surface of the earth an indicator 73 in the transducer control unit 22 responds to variations in the position of the arm 71 to indicate the angular orientation of the transducer units 18 and 19.

Motion of the push rod 49 is also effective to vary the angular position of the other transducers 16 and 17, each of which is supported by pivot pins 75 and 76 for motion about a vertical axis as illustrated in FIG. 8. In these transducers, as shown in FIG. 6, a single electro-acoustic element 77 is mounted at the outer end of a block 78 of the same acoustic absorbing material of which the other transducer blocks 24 are made and corresponding conductors 79 connect these transducers through the cable 11 to the acoustic signal unit 21 at the surface of the earth. Also, a fixed pyramidal block 80 of the same material is mounted in the housing 33 between these transducers to prevent direct transmission of acoustic waves from one to the other.

As best seen in FIGS. 3B and 5, the cross bar 48 carries a support block 81 having two pivot pins 82 and 83 projecting at converging angles toward the front of the housing 33. In addition, two corresponding crank arms 84 and 85 having projections which receive the pivot pins are rotatably mounted on two shafts 86 and 87 having axes which converge in the same manner. To link the crank arms 84 and 85 to the transducers, each carries a downwardly projecting arm 88 and 89 which, as best seen in FIG. 8, has a vertical slot receiving a projection 90, 91 extending rearwardly from the housing of the corresponding transducer assembly 16, 17. As a result, when the cross bar 48 moves in a vertical direction, the crank arms 84 and 85 rotate, turning the arms 88 and 89 so as to impart complementary angular motions to the transducers 16 and 17 about their axes of support, this motion taking place simultaneously with the angular motion of the transducer assemblies 18 and 19.

In operation, the acoustic signal unit 21 energizes the appropriate transducer in each pair of transducers to generate acoustic signals of appropriate frequency, the frequencies preferably being different for the different transducer pairs. Acoustic signals received by the other transducer of each pair produce corresponding electrical signals which are transmitted back to the unit 21 for analysis. In order to obtain the optimum acoustic transmission path, power is supplied from the transducer control unit to the drive motor 59 to move the push rod 49 first in one direction and then in the other. As a result, the transducer assemblies 16 and 17 and 18 and 19 are moved through corresponding arcs in the manner previously described and a signal indicating their angular position is transmitted from the potentiometer 70 to the indicator 73. When the desired angular position is obtained, the motor 59 is de-energized and a record of the acoustic signal transmission characteristics may be made by the acoustic signal unit. Alternatively, if desired, the motor 59 may be energized continuously as the instrument 10 is drawn through the well bore permitting a record to be made of the acoustic signal transmission characteristics for all of the angular positions of the transducers.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. Apparatus for use in a well bore surrounded by earth formations comprising a housing adapted to be passed through the well bore, transducer means comprising a pair of transducer assemblies and including at least two relatively movable transducer elements mounted in the housing for angular motion with respect to the well bore, and drive means for moving the transducer means through a selected range of angular positions with respect to the well bore, said drive means including means for imparting to the pair of transducer assemblies simultaneous complementary angular motions in opposite directions with respect to the housing.

2. Apparatus according to claim 1, wherein each transducer assembly includes a plurality of transducer elements.

3. Apparatus according to claim 1, wherein the pair of transducers is mounted for angular motion in a first plane parallel to the axis of the well bore and wherein the transducer means also includes a second pair of transducers mounted for angular motion in a second plane extending transversely to the axis of the well bore and the drive means includes means for imparting simultaneous complementary angular motions to the second pair of transducers.

4. Apparatus according to claim 1, wherein the drive means comprises lever means linked at opposite sides of its fulcrum to the respective transducer assemblies, and means for imparting angular motion to the lever means.

5. Apparatus according to claim 1, wherein the drive means comprises a linearly movable member and crank arm means linking the linearly movable member with the transducer assemblies in complementary relation.

6. Apparatus according to claim 1, including indicator means for providing indications at the surface of the earth of the angular position of the transducer means in the housing.

7. Apparatus according to claim 6, wherein the indicator means comprises potentiometer means mounted in the housing and connected to the drive means to provide an electrical signal indicative of the angular position of the transducer means.

References Cited

UNITED STATES PATENTS

| 3,136,381 | 6/1964  | Anderson | 340—15.5 |
| 3,346,068 | 10/1967 | Wood et al. | 340—15.5 |
| 2,825,044 | 2/1958  | Peterson | 181—0.5 |
| 3,217,242 | 11/1965 | Braun | 324—1 |
| 2,156,052 | 4/1939  | Cooper | 181—.5 |
| 2,631,270 | 3/1953  | Goble | 340—18 X |

FOREIGN PATENTS 727,790   2/1966   Canada.

SAMUEL FEINBERG, *Primary Examiner.*

JAMES FOX, *Assistant Examiner.*

U.S. Cl. X.R.

340—15.5, 18